No. 846,393. PATENTED MAR. 5, 1907.
J. BUCKLEY.
NAIL AND RIVET MACHINE.
APPLICATION FILED JAN. 21, 1905.
8 SHEETS—SHEET 1.
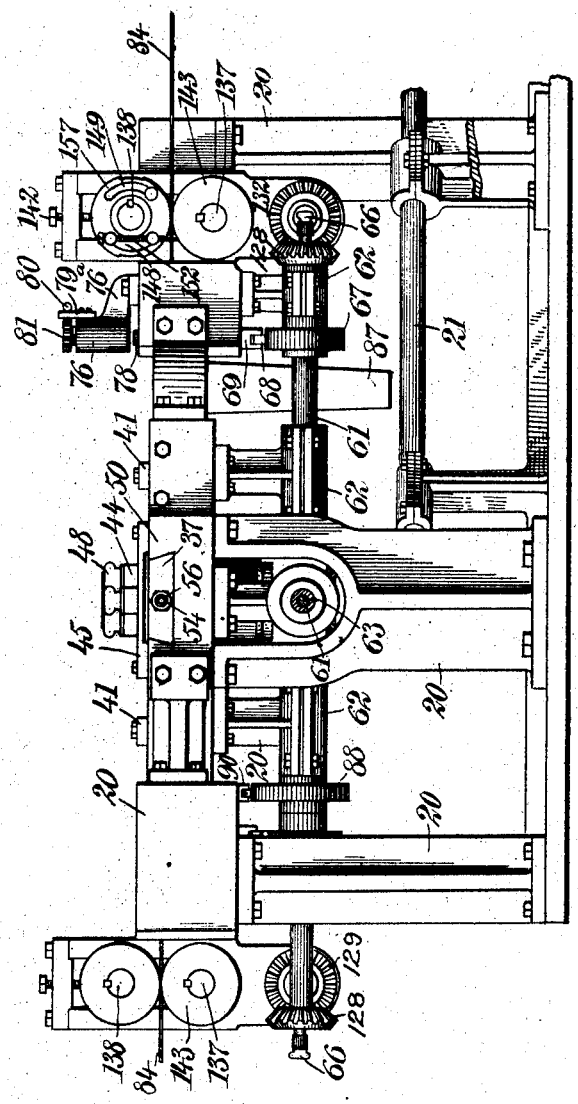
WITNESSES:
C. A. Jarvis
A. E. Fay
INVENTOR
John Buckley
BY
ATTORNEYS

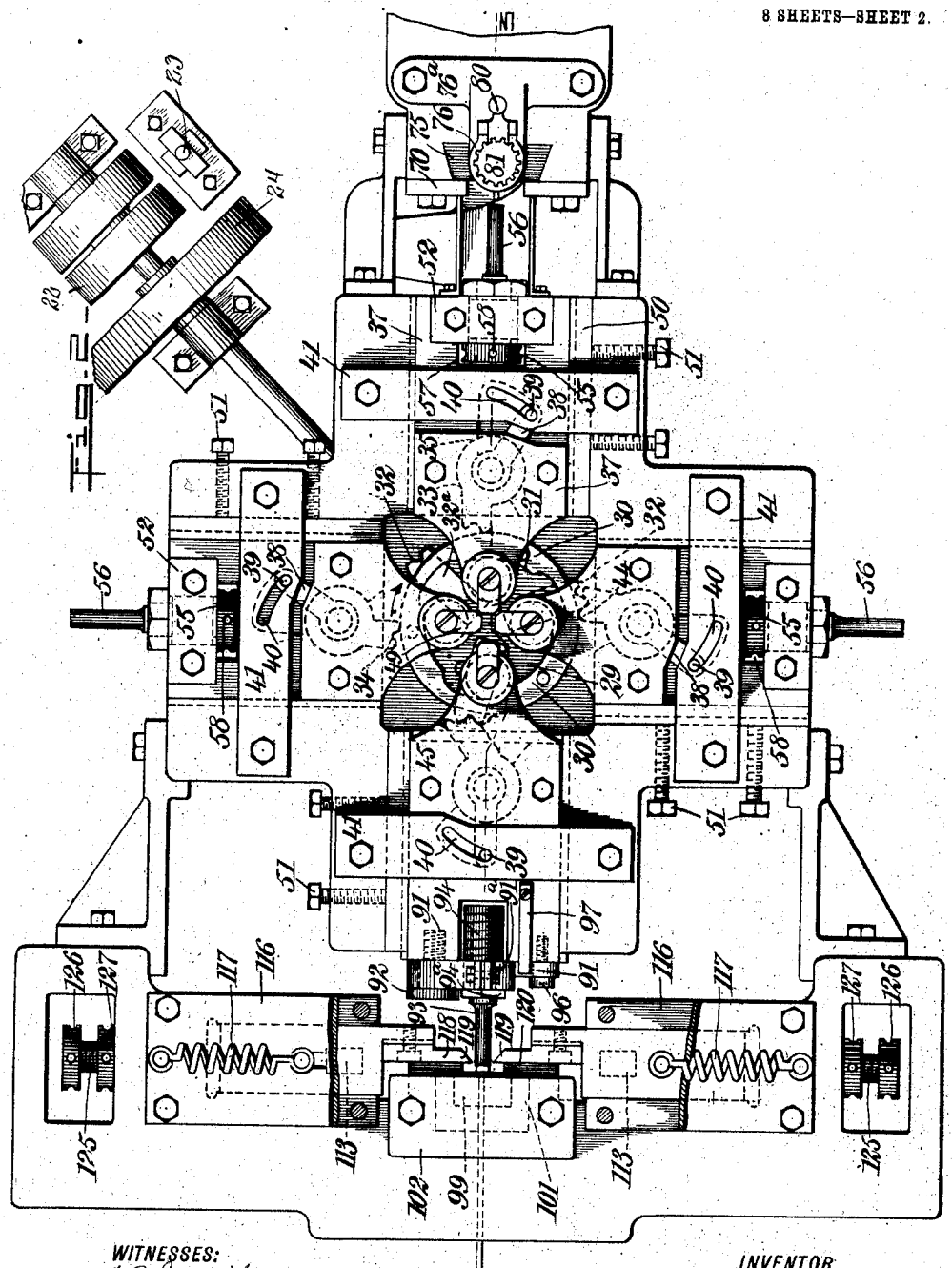

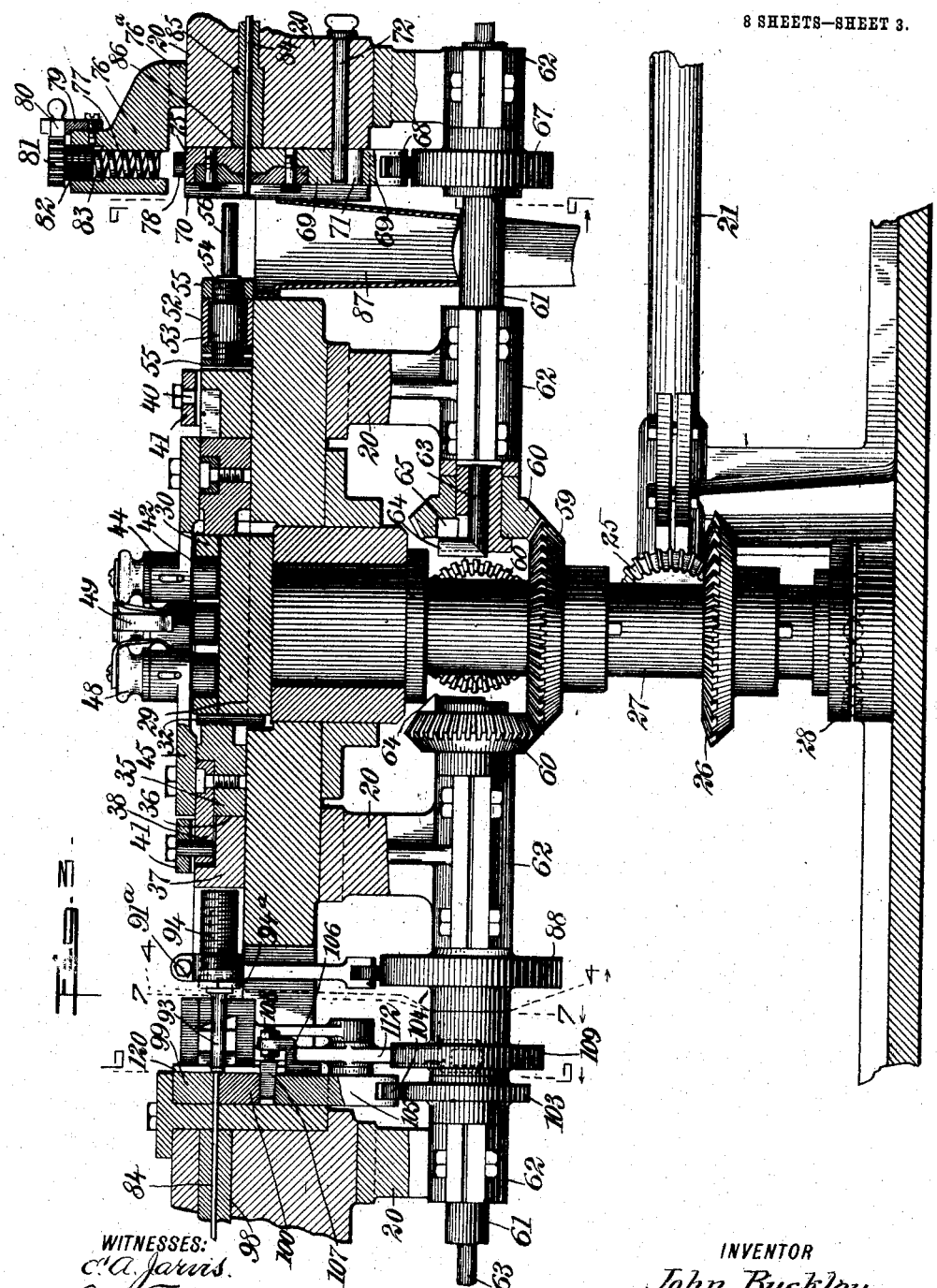

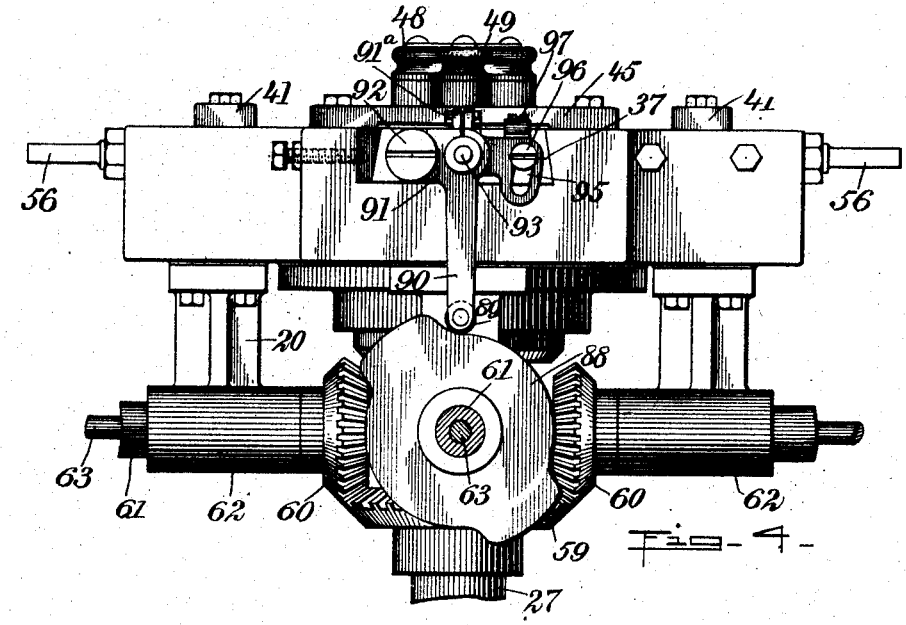
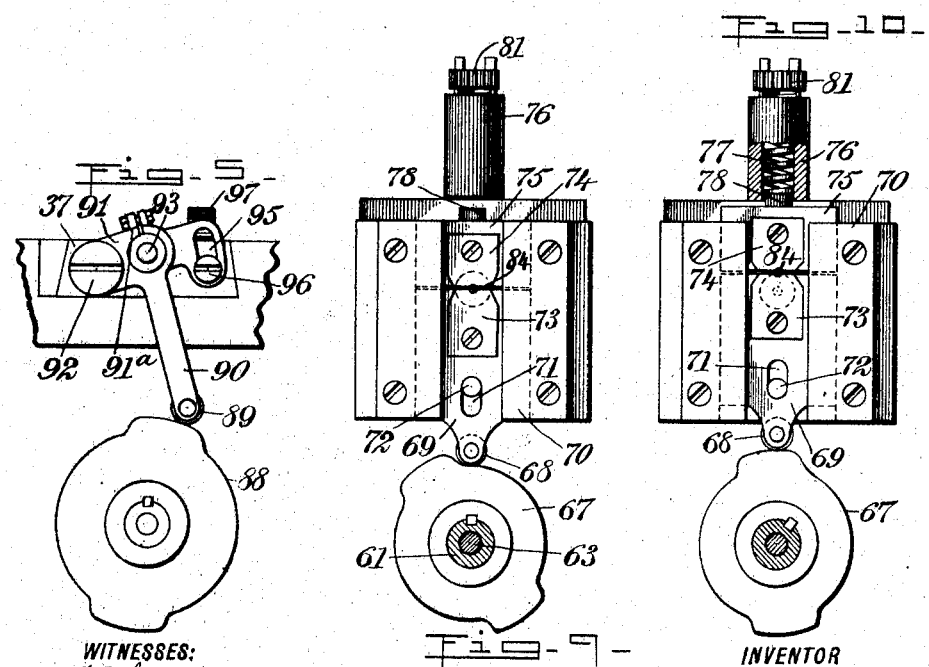

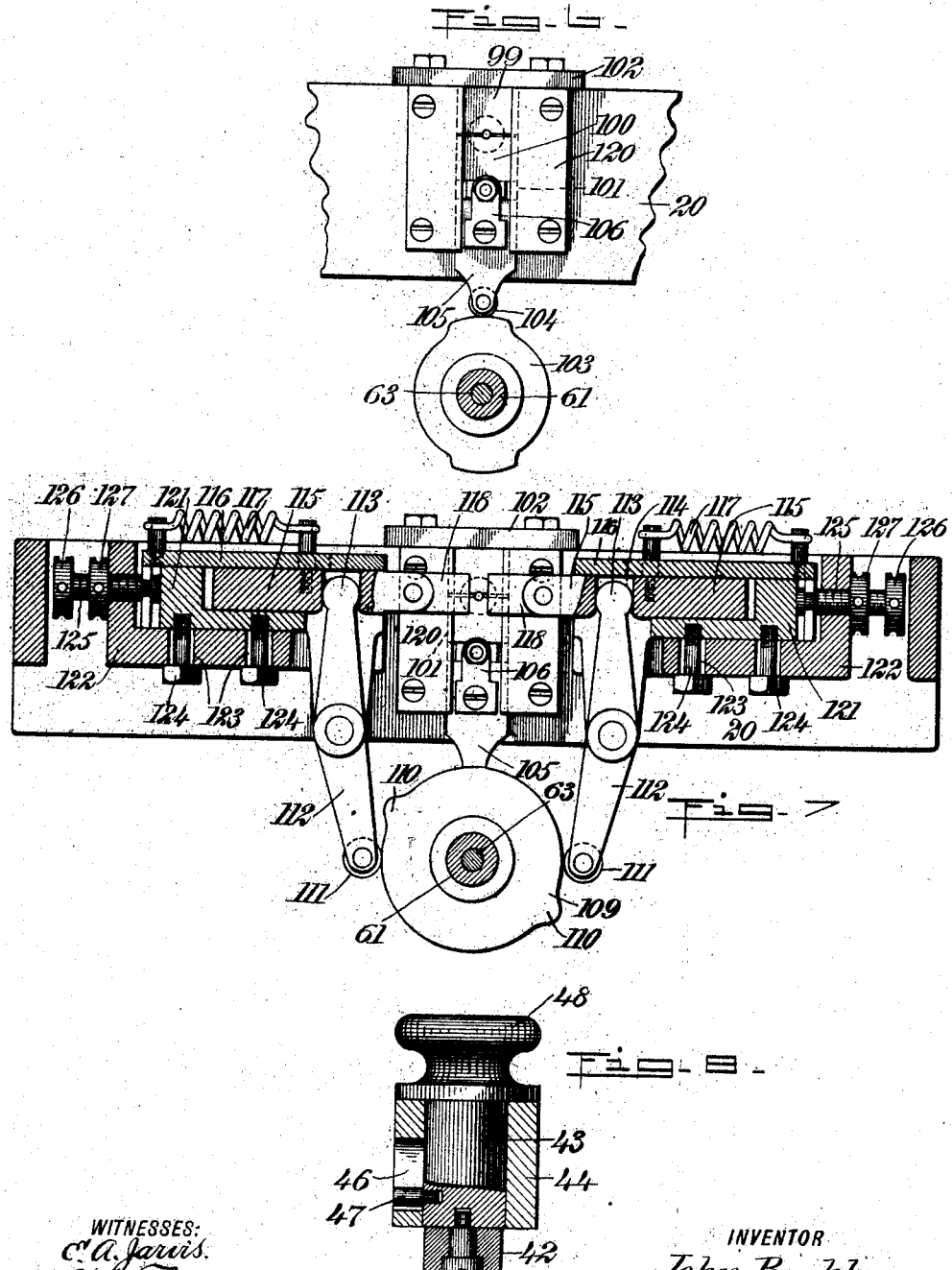

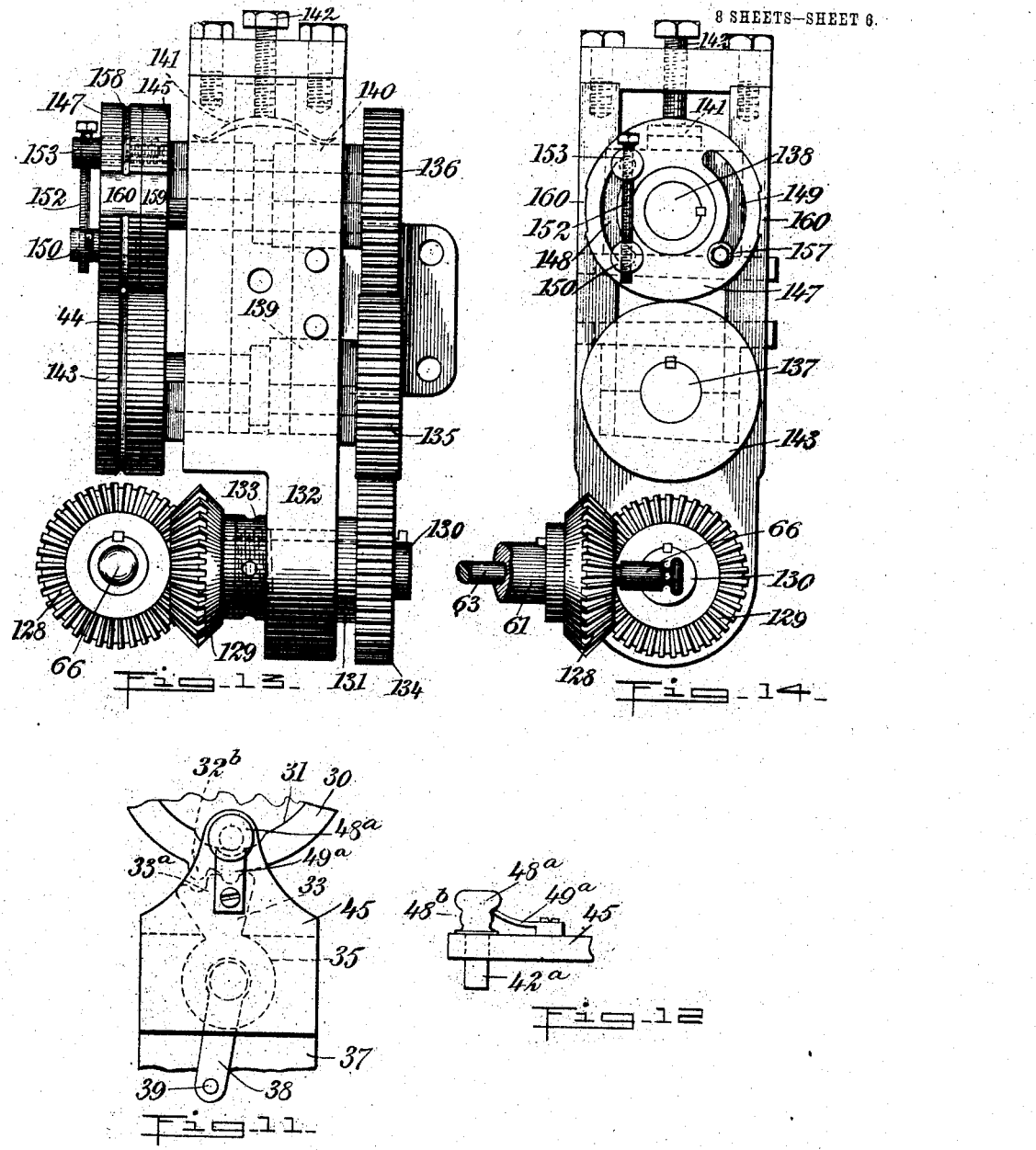

No. 846,393. PATENTED MAR. 5, 1907.
J. BUCKLEY.
NAIL AND RIVET MACHINE.
APPLICATION FILED JAN. 21, 1905.
8 SHEETS—SHEET 7.
INVENTOR
John Buckley
BY
Munn
ATTORNEYS
WITNESSES:
C. A. James
A. E. Fay No. 846,393. PATENTED MAR. 5, 1907.
J. BUCKLEY.
NAIL AND RIVET MACHINE.
APPLICATION FILED JAN. 21, 1905.

8 SHEETS—SHEET 8.

WITNESSES:
C. A. Jarvis
A. E. Fay

INVENTOR
John Buckley
BY
mumm
ATTORNEYS

UNITED STATES PATENT OFFICE.

JOHN BUCKLEY, OF WATERBURY, CONNECTICUT.

NAIL AND RIVET MACHINE.

No. 846,393.  Specification of Letters Patent.  Patented March 5, 1907.

Application filed January 21, 1905. Serial No. 242,077.

*To all whom it may concern:*

Be it known that I, JOHN BUCKLEY, a citizen of the United States, and a resident of Waterbury, in the county of New Haven and State of Connecticut, have invented a new and Improved Nail and Rivet Machine, of which the following is a full, clear, and exact description.

My invention relates to machines capable of use for making nails and rivets.

The chief objects of the invention are to provide a multiplex machine which can be used for simultaneously making a plurality of rivets, nails, and the like and in which portions can be readily thrown out of gear by a very simple manipulation of the parts, so as to provide for making any smaller number of articles. In this way the machine can be employed for making a single rivet at a time or for simultaneously making a nail and a rivet or a plurality of either.

Further objects of the invention are to provide means for manipulating dies and cutting-off devices so as to produce the desired articles, for feeding wire to the several dies at the desired times, and for providing an adjustment of the wire-feeding devices so that the proper length of wire to be fed for each operation may be regulated.

In addition to these objects certain others will appear in the course of the subjoined description, which are largely dependent upon these and to some extent contained in them.

Reference is to be had to the accompanying drawings, forming a part of this specification, in which similar characters of reference indicate corresponding parts in all the figures.

Figure 21:
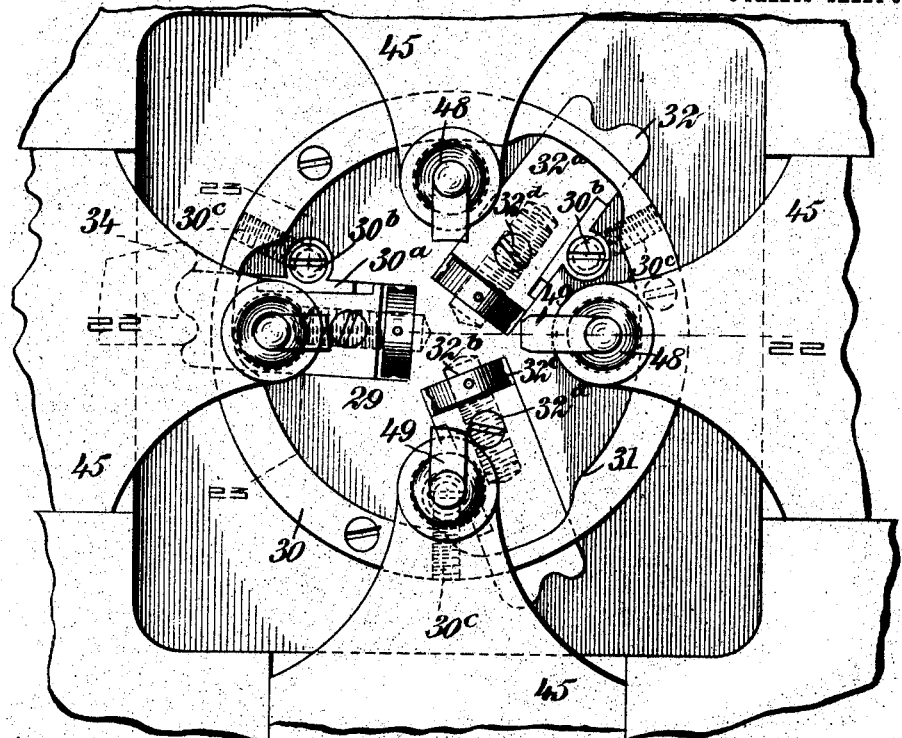
Figure 22:
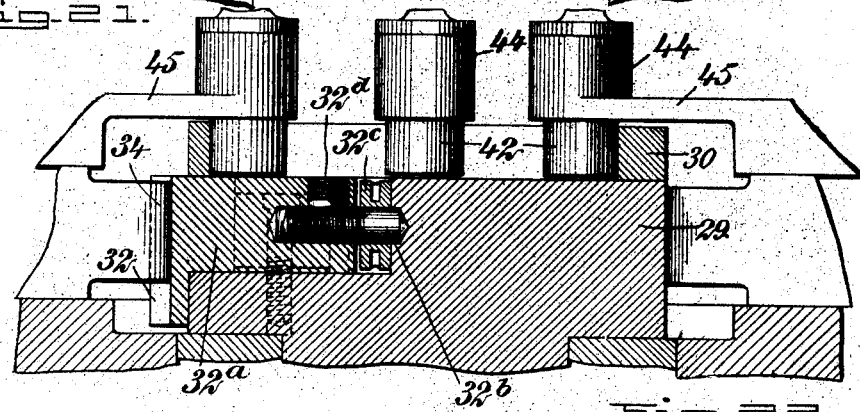

Figure 1 is a side elevation of a practical embodiment of my invention with parts broken away to show the construction of details, the driving-pulley being omitted. Fig. 2 is a plan view of the same on an enlarged scale. Fig. 3 is a sectional view on the line 3 3 of Fig. 2. Fig. 4 is a sectional view on the line 4 4 of Fig. 3. Fig. 5 is a fragmentary view showing parts illustrated in Fig. 4 in a different position. Fig. 6 is a sectional view on the line 6 6 of Fig. 3. Fig. 7 is a sectional view on the line 7 7 of Fig. 3. Fig. 8 is a sectional view of a detail on an enlarged scale. Figs. 9 and 10 are sectional views on the line 9 9 of Fig. 3, showing the parts in different positions. Fig. 11 is a fragmentary plan view showing another form of certain details. Fig. 12 is a fragmentary side view of the same. Fig. 13 is a front elevation of a portion of the machine constituting a feeding device for nails. Fig. 14 is a side elevation of the same. Fig. 15 is a side view, on an enlarged scale, of a detail of said feeding device. Fig. 16 is a plan view of the same. Fig. 17 is a sectional view on the line 17 17 of Fig. 15. Fig. 18 is an end elevation of an attachment for a feeding device for rivets. Fig. 19 is a sectional view on the line 19 19 of Fig. 18. Fig. 20 is a plan of the device shown in Fig. 18. Fig. 21 is a fragmentary plan, on an enlarged scale, to show details. Fig. 22 is a sectional view on the line 22 22 of Fig. 21, and Fig. 23 is a sectional view on the line 23 23 of Fig. 21.

The frame 20 of the machine is preferably set up in a shop at an angle to the walls thereof, so that the driving-shaft 21 may be located parallel to the walls and to the other shafting. The driving-shaft is provided with fast and loose pulleys 22, a shipper 23, and balance-wheel 24, as usual, and with a pinion 25, meshing with a gear 26, mounted upon a vertical shaft 27, located at or near the center of the machine. This vertical shaft is preferably provided with ball-bearings 28 at its lower end to support its entire weight. Near its upper end it is provided with a head 29, which has attached thereto an annular flange 30, provided with an interior cam-surface 31, and said head is also provided with a series of cams 32, formed on slides 32ª. These cams are designed to engage with toggle-levers 33. These toggle-levers are each provided with a shoulder 34 for engagement with the cam-surfaces 32 and are held by means of a cylindrical portion 35 in an opening 36 in a slide 37. They are also each provided with a rigid projection 38, having a pin 39 thereon projecting through a curved slot 40 in a stationary plate 41.

It will be observed that when a cam-surface 32 comes into contact with one of the shoulders 34 the toggle will be caused to rotate in its bearing 36 and will force the slide in an outward direction from the center of the machine. In order to pull the slide back into its former position, the cam-surfaces 31 upon the interior of the flange 30 come into contact with rollers 42, which normally project into the depression inside the flange 30. The direct result of this is to draw the slide inwardly; but the engagement of the pin 39 in the slot 40 causes the lever 33 to swing around on its pivot 35 into such position that the next approaching cam-surface 32 will engage the shoulder 34 thereon. These rollers are rotatably mounted upon spindles 43, which are contained in bearing-casings 44, attached by means of plates 45 to the slides 37. Each of the casings is provided with a slot 46, and each of the spindles 43 is provided with a pin 47, working vertically in said slot for preventing the spindle from turning. On the upper end of each spindle is a head 48, and connected with said head is a spring 49. When it is desired to throw one of the sections of the machine out of operation, the corresponding head 48 is raised until the spring 49 rests upon the top of the casing 44, the pin 47 passing to the upper extremity of the slot 46. It will readily be seen that when the spindle is raised in this manner the roller corresponding to it will be raised out of connection with the cam-surfaces 31, and consequently the slide 37 will not be drawn back toward the center of the machine until the roller is again lowered into the position shown in Fig. 3.

Figure 23:
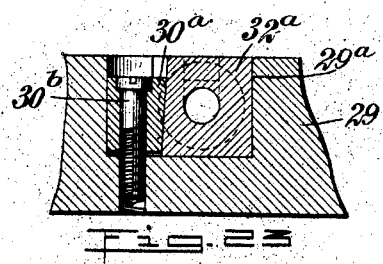

In Figs. 21, 22, and 23 I have shown in more detail a means of adjusting the cam-surfaces 32. They are mounted on slides 32$^a$, designed to move in ways 29$^a$ in the head 29 for forcing the cam outward. A screw 32$^b$, having a head 32$^c$, is used to cause this motion, and it is secured in adjusted position by a set-screw 32$^d$. A key 30$^a$ is used for securing the slide 32$^a$ and is secured in position by a screw 30$^b$ passing into the head 29. A screw 30$^c$ is used for holding the screw 30$^b$ in adjusted positions. It will be seen that the key by its peculiar shape will hold the slide firmly against the bottom, opposite side, and back of the ways in which it rests.

The slides 37 move in ways 50, which may be secured in position by screws 51 or in any other desired manner. These slides are provided with caps 52, bolted to them and provided with a passage in which can be placed the main body of a bushing 53. This body is provided with screw-threaded portions 54, and nuts 55 are provided for locking it in any adjusted position, according to the location of the nuts upon these screw-threaded portions. The bushing carries a die 56, which may be of any desired construction, but in the present instance is provided with a surface suitable for the formation of the head of a rivet or nail. The nuts 55 may be of any desired construction; but the inner one, which is located in an opening 57, may for convenience be provided with a series of circumferential holes 58 for the reception of a spanner.

The parts so far described are or may be constructed in the same manner whether a rivet or a nail is to be formed, and, with the exception of the shape of the die, the parts would not have to be changed if other articles than nails or rivets were designed to be constructed.

The special construction of the rivet-making devices in addition to the dies will now be described.

Upon the shaft 27 a gear 59 is mounted, meshing with pinions 60. In the form shown the ratio between the gear and pinion is as three to two. These pinions are mounted to rotate upon shafts 61, one of which is preferably located under each of the sections of the machine described above and is supported by bearings 62, depending from the frame of the machine. These shafts are preferably located diagonally of the building and make angles of about forty-five degrees with the shaft 21. Each shaft 61 is hollow, and through it passes a rod 63, provided with a projection 64 upon one end. This projection is designed to pass into a slot 65 in the pinion 60, and it will be readily understood that, the rod being prevented from turning independently of the shaft 61 by keys, (not shown,) when the projection 64 is pulled into the slot 65 the rotation of the pinion 60 will cause a corresponding rotation of the shaft 61, as shown at the left of Fig. 3. In Fig. 1 are shown hand-pieces 66 for operating the rods 63 so as to throw the shaft 61 into or out of gear with the shaft 27, as desired.

On the shaft 61 is a cam 67, operating a roller 68, connected with a slide 69. This slide operates in ways 70, mounted on the frame. It is provided with an elongated slot 71, into which passes a pin 72, mounted in the frame. The slide also carries a die-section 73, which is adapted to coöperate with a second die-section 74 to hold the wire for forming a rivet. The second die-section is mounted upon a second slide 75, also operating in the ways 70. Above the slide 75 is mounted a casing 76, which contains a spring 77, adapted to engage with a short plunger 78 upon the top of the slide 75 for returning both slides to their lower position after the cam 67 ceases to press them upwardly in case gravity does not accomplish this result. The casing 76 is mounted on a standard 76$^a$ and is provided with a bracket 79, upon which is mounted a pawl 80, meshing with a toothed wheel 81, which in turn is mounted upon a screw 82, engaging in the screw-threaded portion of an opening 83 in the casing and bearing upon the upper end of the spring 77. It will be readily understood that upon turning the screw 82 and securing it in any desired position by means of the pawl 80 engaging with the teeth of the wheel 81 the spring can be adjusted to any desired position so as to provide for the proper action thereof.

The wire 84 of which the rivet is to be made passes through a guide 85, mounted in the frame and provided with an edge 86, against which the slides 69 and 75 operate.

From the position shown in Fig. 3 the slides are forced upwardly by the cam 67, and in doing so their edges and the edge 86 sever the wire. When the dies are in their uppermost position, as shown in Fig. 10, they will hold the wire between them, and at this moment the die 56 will be forced up against the dies 73 and 74 to form the head of the rivet. When the rivet is formed and the cam 67 turns to the position shown in Fig. 9, the rivet is designed to fall from the dies and drop down through a chute 87 to a receptacle (not shown) or to any desired place for the collection of the product of the machine. If it does not fall when the dies are opened, it will be forced out by the feed of the rod or blank 84.

The device which I have illustrated for making nails will now be described. This is shown at the left of Figs. 2 and 3, and details of it are shown in Figs. 4, 5, 6, and 7. The shaft 61 upon this side of the machine is supplied with a rod 63 and its connections in the same manner as is described above. A cam 88 is also provided, similar in many ways to the cam 67, but having a somewhat different function. Reference is to be had to Figs. 4 and 5 for an illustration of this feature. This cam operates a roll 89 upon an arm 90, extending from a pivoted block 91. This block is pivotally connected with the slide 37, which is similar to the other three slides, by means of a screw 92 or any other equivalent device. The block 91 has a split bearing 91ª, in which is mounted a heading-die 93 for the nails, and this die is secured in a threaded bushing 94, having an integral nut 94ª. For a reason which will be referred to later it is not convenient to withdraw the die 93 sufficiently far from the place at which it operates to permit the nail produced to be discharged from the other dies which coöperate in its manufacture. Consequently the block 91 is provided to lift the die 93 away from the nail after it has performed its function. A slot 95 is provided in the block, and a screw or stop 96, mounted on the slide, passes through the slot 95, so as to limit the extent of motion of the block about its pivot. A spring 97 is mounted on the top of the slide and bears upon the top of the block. This spring is designed to return the block to its lowermost position after the eccentric has ceased to push it upward.

The wire for the nail is passed through a guide 98 in a similar manner to the wire for the rivet and enters between dies 99 and 100. As shown in Fig. 6, these dies work in ways 101, mounted on the frame, and when the die 100 is forced up against the die 99 and the latter against a positive stop 102 the wire is gripped by them, and the blow of the die 93 is received by these dies in such a manner as to permit the head of the nail to be formed on the wire without causing any longitudinal motion of the wire. For accomplishing this result a cam 103 is mounted on the shaft 61 and operates a roller 104 on a slide 105, also working in the ways 101. On this slide is mounted a bracket 106, and this bracket is provided with a wedge 107, adjustably mounted thereon by means of a screw on the wedge entering a slot in the bracket, the screw being secured by nuts 108. The top of the slide 105 is made on a slight incline, and the bottom of the wedge is made on a similar incline, so that by adjusting the wedge in or out the top of the wedge (which is virtually the top of the slide) can be adjusted. It will consequently be seen that the height to which the slide 100 can be forced by the cam 103 is regulated by the adjustment of this wedge. This is to provide for varying the grip and for other variable features in the operation of the machine. After the head on the nail is made the die 100 is allowed to descend, so that the grip on the wire is relaxed, and the feeding means, which will be described later, pushes the wire through the dies. Before the wire is pushed forward the cam 88 operates to lift the die 93 out of the way in the manner described above, and after the wire is pushed forward the desired distance the nail is severed from the wire of which it is made. This is accomplished in the following manner, reference being had to Fig. 7: On the shaft 61 is mounted a cam 109, provided with two opposite projections 110. Both of these projections are designed to operate rollers 111 on arms 112. These two arms are pivoted on opposite sides of the shaft 61, and each has a finger 113, designed to enter a depression 114 in a slide 115. These two slides are mounted in guides 116 and are returned to normal positions by springs 117, connected at one end with the guides and at the other with the slides. Each of the slides carries a knife 118, which, as shown in Fig. 2, are provided with tapering edges 119 and slide against projections 120 in front of the dies 99 and 100. It will be readily seen, therefore, that when the projections 110 operate the levers 112 in an obvious manner the knives will be forced together to sever the wire and at the same time depress the opposite sides of the end of the nail produced. This depression or forging action will cause a sharpening of the nail, and it will be readily understood that the shape of the knives may be so designed as to produce any desired kind of a sharpening action. It will also be seen that on account of the projection 120 the wire will be left projecting from the dies 99 and 100 sufficiently for the formation of the head of the next nail by the die 93.

The slides 115 are preferably mounted in frames 121, which are adapted to be adjusted in boxes 122 on the main frame of the machine and on which the arms 112 are pivoted.

These boxes are provided with elongated slots 123 for bolts 124 to permit this adjustment without displacing the frame 121, and screws 125 are connected with the frames and pass through scew-threaded passages in the boxes, so as to provide for this adjustment. A head 126 and a lock-nut 127 are mounted on each screw, and they are preferably provided with circumferential depressions for the reception of a spanner, but may be constructed in any ordinary or desired manner. The operation of this part of the device will be readily understood, and it will be obvious that although I have shown only one section of the machine as constructed in this manner, yet two or more of the sections could be so made without departing from the spirit of my invention. The cams 67, 88, and 103 are preferably made double to provide for making two articles for each revolution of the shafts 61.

In Figs. 11 and 12 is shown another form of the means for transmitting motion to the slides 37 and for putting them out of operative position. In place of the cam 32 a double cam-surface 32$^b$ is provided upon the head 29, and a corresponding cam-surface 33$^a$ is provided upon the toggle 33. One of the projections 32$^b$ is farther from the center of the head 29 than the other. This provides for additional security in the operation of the device, avoids the sudden blow of the crank, gives more time for crushing, and prevents slipping. The parts 31, 35, 37, 38, 39, and 45 will be the same as those shown in the other figures. Instead of the rollers 42 pins 42$^a$ are employed, and connected with them are knobs or handles 48$^a$, which are provided with a curved surface 48$^b$ above the plate 45. A spring 49$^a$ is provided for engaging the curved surface, so as to hold the pin 42$^a$ in its lowermost position when in the upper part of the surface and to hold it elevated when held under the lower part thereof. It will be readily understood that these changes come within the scope of my invention.

In order to provide for the efficient operation of the device, feeding devices are mounted upon the machine, one for rivets and one for nails. A preferred form of the former will now be described, referring especially to Figs. 13, 14, 15, 16, and 17.

Upon each of the shafts 61 is mounted a gear 128, adapted to mesh with a gear 129 upon a shaft 130, preferably at right angles to the shaft 61. This shaft is journaled in a bearing 131 upon a main frame 132, which is mounted upon the main frame of the machine. The bearing is preferably secured in position by means of a nut 133. Upon the opposite end of the shaft 130 is keyed a gear 134. This gear meshes with and drives a gear 135, which in turn drives a gear 136. These two gears are mounted upon a pair of parallel shafts 137 and 138, and it will be obvious that when the shaft 61 rotates the shafts 137 and 138 will rotate in opposite directions. The shaft 137 is mounted in stationary bearing 139 on the frame 132, while the shaft 138 is mounted in movable bearings 140 upon the same frame. A spring 141 bears upon the bearings 140, and a screw 142 is employed to secure the spring in close contact with the bearings and to provide for holding the bearings in lowermost position when no force is exerted to move it from that position. It will be readily understood that the movement of the bearings 140 away from the bearings 139 is sufficiently small to prevent the gears 135 and 136 from moving out of contact with each other.

Upon the shaft 137 is mounted a disk 143, having a groove 144 for the wire to be fed. On the shaft 138 is keyed a disk 145, provided with a shoulder 146, upon which is rotatably mounted a second disk 147. This second disk is provided with a pair of arc-shaped slots 148 and 149, through the former of which projects a stud 150. This stud is secured in the disk 145 by means of a countersunk nut 151, and it is obvious that, as the disks are mounted upon the same center and as the slots are formed on arcs of circles drawn from the same center, the stud 150 can move through the slot 148 lengthwise. The upper end of the stud 150 is provided with a passage through which a screw-threaded rod 152 is adapted to pass. This rod is also swiveled in a stud 153, mounted upon the disk 147. The rod 152 is provided with a groove 154, into which a pin 155, secured in the stud 153, extends. It will be observed that by this construction, the stud 154 being swiveled to the disk 147 and the rod 152 being attached by means of screw-threads in the stud 150, the two disks can be adjusted with respect to each other upon their axes by the turning of the rod or screw 152. The top of the stud 150 is split to provide for proper adjustment of the rod 152, and the parts are held in the desired position by means of a screw 156. It will be understood that both studs are capable of turning upon their own axes sufficiently to permit the proper operation of the rod or screw 152. Through the slot 149 also projects a stud or bolt 157, which is secured to the disk 145 and serves to assist in clamping the disks.

Upon the edge of the disk 147 is located a groove 158, adapted to register with the groove 144. These two grooves together are sufficiently large to receive the wire operated upon by the machine and to guide it. They are too large, however, to grip the wire under ordinary conditions, and consequently when the two sets of disks are rotated in the ordinary manner on the wire passing through the grooves formed between them the wire will simply be held in position ready to enter the dies in the machine, but will not be moved forward on account of the size of the grooves. The disks 145 and 147 are provided with depressions or cut-away places 159 and 160 on opposite sides. These depressions are sufficiently deep to permit the disk 147 to drop slightly when the depressions are reached and to cause the surface of the depression 160 to grip the wire while the disk is in this lowered position. The spring 141 serves to assist in this operation. It will be apparent that when the two depressions are in registering position, as shown in Fig. 16, the space of time during a rotation in which wire will be positively fed forward by the disks is at its maximum. By adjusting the disks angularly upon their axes the two depressions can be caused to register only for a diminished portion thereof, as shown in Fig. 15, and the amount of wire fed will be regulated accordingly, because the only time at which feeding takes place is when both depressions are in contact with the edge of the disk 143. The way in which the device is regulated by this means to produce rivets will be readily understood. It will be seen that the adjustment can be varied to any desired amount and that rivets can be made of variable lengths within the limits furnished by the size of the depressions 159 and 160.

For feeding wire to make nails a different device is designed, for the reason that nails are usually furnished in definite sizes, and no adjustment is desired between any two standard sizes. It is consequently desirable to have an adjusting means, which will provide for changing the lengths of wire fed to the machine by definite steps—as, for example, changing from three-quarters of an inch to one inch and the like, no nail being made of any size between these two. When it is desired to feed wire for nails, therefore, a different construction from that above described is preferably employed. This construction is represented in Figs. 18, 19, and 20 of the drawings and comprises a pair of disks 161 and 162, constructed in a somewhat similar manner to the disks 145 and 147. The disk 162 is provided with a hub 163 and with studs 164 and 165, the latter being rotatably mounted in the disk by means of a countersunk nut 166. The disk 161 is provided with slots 167 and 168 for receiving these two studs, and a screw-threaded rod 169 passes through the head of the stud 165 and of another stud 170, mounted on the disk 161. A groove 171 and pin 172 are also employed, as before; likewise an adjusting device 173 on the stud 165. The stud 165 is also swiveled on the disk 161, as will be readily understood.

It will be evident that the two disks may be adjusted with respect to each other in the same manner as before. These two disks, however, are not provided with grooves for feeding wire, but are provided with teeth 174 and 175. While the main portion of the edges of the disks is plain, the two series of teeth are located at opposite sides of each disk, and preferably the same number of teeth are mounted upon each disk.

It will be readily understood that by adjusting the disks about their own axes, as set forth above, more or less of the teeth of the two disks can be caused to register with each other. Consequently supposing each disk to be provided with three teeth they can be so arranged that six teeth in all will be adapted for operative connection with the gear 135, and they can also be so adjusted that either five, four, or three teeth can be placed in operative position. This, it will be readily understood, will be accomplished by placing the teeth of each disk with one or more of them registering with one or more of the teeth of the other disk.

It will be obvious that when the shaft 61 rotates with these disks substituted for the gear 134 a complete rotation of the shaft will cause the gears 135 and 136, and consequently the shafts 137 and 138, to rotate a definite amount of one revolution for each complete revolution of the shaft 61. When this construction is employed, the disks 145 and 147 are replaced by a plane disk exactly like the disk 143 and provided with a groove similar to the groove 144, and the rotation of the gears 135 and 136 will obviously be transmitted to the two plane disks upon the shafts 137 and 138 to cause the proper feed of the wire for each nail. It will be seen that the same principle is employed in these two feed devices, although carried out in a different manner.

While I have illustrated and described a particular embodiment of my invention, it will be readily understood that many changes may be made in the construction illustrated and that the principle of the machine may be carried out in many other forms, the invention not being limited to that illustrated.

Having thus described my invention, I claim as new and desire to secure by Letters Patent—

1. A metal-working machine, comprising a main shaft, a head connected therewith, a metal-working die, and means connected with said die for engaging said head and transmitting motion therefrom to the die; said means comprising a slide upon which said die is mounted, and provided with a circular opening, an arm having a cylindrical portion fitting in said opening and provided with a projection having a depression, a cam-surface on the head, having a shape corresponding to the depression in the arm and adapted to engage therewith to swing the arm upon the axis of the cylindrical portion as a center, said arm being provided with a pin and a stationary element having a guide-slot for said pin.

2. In a metal-working machine, the combination with the shaft, of a head operated thereby, a die-carrying slide, a second slide connected with the head and provided with a cam for operating the die-carrying slide, and means for adjusting said second slide toward and from the head, thereby to vary the movement of the die-carrying slide.

3. A metal-working machine comprising a rotatable cam, a die and means connected with said die for engaging said cam and transmitting motion therefrom to the die and for disengaging the die from the cam; said means comprising a bodily-movable roller, a head for supporting the roller, and a spring adapted to engage said head and hold the roller in elevated position out of contact with said cam.

4. A metal-working machine comprising a rotatable cam, a die, means connected with said die for engaging said cam and transmitting motion therefrom to the die; said means comprising a bodily-movable roller and means for disengaging the roller from the cam, said disengaging means comprising a movable element connected with said roller and adapted to move the latter out of engagement with the cam.

5. A metal-working machine, comprising a cam, a die, a head, a roller for engaging the cam supported by the head and connected with the die, said head being movable whereby to disengage the roller from the cam.

6. A metal-working machine, comprising a rotatable head having an internal cam and an external cam, a die, means for transmitting motion to the die in one direction from the external cam, means for transmitting motion to the die in the other direction from the internal cam, said first-mentioned means comprising a toggle, and said last-mentioned means comprising a roller, said toggle and roller being connected with the die, and means for disengaging the roller from the internal cam, while the toggles remain in connection with the external cam.

7. A metal-working machine, comprising a main shaft, a head mounted thereon and provided with an external cam and an internal cam, a die, means connected with said die and adapted to be engaged by said external cam for moving the die, a frame connected with the die, a spindle reciprocatingly mounted in said frame and provided with means for limiting the extent of its motion, a knob mounted upon one end of said spindle, a spring mounted upon said knob and adapted to engage with said frame to hold the knob in elevated position, and a roller rotatably mounted upon one end of the spindle and adapted to engage with the internal cam.

8. A metal-working machine, comprising a main shaft, a head mounted thereon and provided with an external cam and an internal cam, a die, means connected with said die and adapted to be engaged by said external cam for moving the die, a frame connected with the die, a spindle reciprocatingly mounted in said frame, knob mounted upon said spindle, a spring mounted upon said knob and adapted to engage with said frame to hold the knob in elevated position, and a roller mounted upon each spindle for engaging the internal cam.

9. A metal-working machine, comprising a main shaft, two cams connected therewith, a die, means connected with said die and adapted to be engaged by one of said cams for moving the die, a frame connected with the die, a spindle reciprocatingly mounted in said frame, means for holding said spindle in an elevated position, and a roller rotatably mounted upon the spindle and adapted to engage the other cam.

10. A metal-working machine, comprising a main shaft, a head mounted thereon and provided with two cams, a die, means connected with said die and adapted to be engaged by one of said cams for moving the die in one direction, a frame connected with the die, a roller movably connected with said frame and adapted to engage with the other cam for moving the die in the opposite direction, and resilient means for holding the roller in elevated position.

11. A metal-working machine, comprising a main shaft, a head mounted thereon and provided with an external cam and an internal cam, a die, means connected with said die and adapted to be engaged by one of said cams for moving the die, a movably-mounted roller connected with said means and adapted to engage with the other cam for moving the die in the opposite direction, and means for holding the roller in operative position and in inoperative position.

12. A metal-working machine, comprising a main shaft, a head connected therewith, an external cam and an internal cam on said head, a metal-working device, means for connecting said metal-working device with said cams, said means comprising a toggle-joint and a roller said metal-working device comprising a heading-die adapted to be reciprocated by said cams, a cutting device, means for operating said cutting device from said main shaft, a pair of dies adapted to grip a wire for holding it when said heading-die operates, and means connected with said main shaft for moving one of said last-mentioned dies in a path transverse to the path of movement of the heading-die and against the other of said pair of dies.

13. A metal-working machine, comprising a main shaft, a head connected therewith, an external cam and an internal cam on said head, a metal-working device, means for connecting said metal-working device with said cams, said means comprising a toggle-joint and a roller said metal-working device comprising a heading-die adapted to be reciprocated by said cams, a cutting device, means for operating said cutting device from said main shaft, a pair of dies adapted to grip a wire for holding it when said heading-die operates, means connected with said main shaft for moving one of said last-mentioned dies in a path transverse to the path of movement of the heading-die and against the other of said pair of dies, and means operable from the main shaft for swinging the heading-die on an axis parallel to its line of reciprocating movement.

14. A metal-working machine, comprising a main shaft, a slide, means connected with the main shaft for reciprocating said slide, a heading-die connected with said slide and reciprocable therewith, a pair of gripping-dies, means for operating said pair of dies, a shearing device comprising a pair of jaws movable in a line transverse to said heading-die, and means for forcing said jaws toward each other; said means comprising a pivoted lever connected with each die, and a cam connected with the main shaft and provided with two projections for engaging with said levers.

15. A metal-working machine, comprising a main shaft, a slide, means connected with the main shaft for reciprocating said slide, a heading-die connected with said slide and reciprocable therewith, a pair of gripping-dies, means for operating said pair of dies, a shearing device comprising a pair of jaws movable in a line transverse to said heading-die, means for forcing said jaws toward each other, means for adjusting said jaws toward and from each other, and resilient means for drawing them away from each other.

16. A metal-working machine, comprising a main shaft, a slide, means connected with the main shaft for reciprocating the slide, a heading-die mounted upon the slide, and means for moving the heading-die in a path transverse to the line of movement of the slide; said means comprising a block pivoted to the slide and carrying said die, said block being provided with a slot concentric with the axis upon which it is pivoted and said die being provided with a stud passing through said slot for limiting the motion of the block about its pivot, a cam connected with the main shaft for swinging said block in one direction about its pivot, and a spring mounted on the slide for forcing the block in the opposite direction.

17. A metal-working machine, comprising a slide, a heading-die mounted on the slide, and means for moving the heading-die in a path transverse to the path of motion of the slide, said means comprising a block pivoted to the slide and carrying said die, said block being provided with a slot and said die being provided with a stud passing through said slot for limiting the motion of the block about its pivot.

18. A metal-working machine, comprising a slide, a heading-die mounted on the slide, means for moving the heading-die in a path transverse to the path of motion of the slide, said means comprising a block pivoted to the slide and carrying said die, said block being provided with a slot and said die being provided with a stud passing through said slot for limiting the motion of the block about its pivot, a cam connected with the main shaft for swinging said block in one direction about its pivot, and a spring mounted on the slide for forcing the block in the opposite direction.

19. A metal-working machine, comprising a shaft, a slide, means connected with the shaft for reciprocating the slide, a plate pivoted by one end upon the front of the slide, a heading-die mounted upon the plate, and means for swinging the plate upon its pivotal connection, whereby to bodily move the heading-die transversely of the line of reciprocation of the slide while retaining it in parallelism therewith.

20. A metal-working machine comprising a shaft, a slide, means in connection with the shaft for reciprocating the slide, a plate pivoted by one end to the front of the slide, a heading-die mounted centrally on the plate, means for swinging the plate whereby to bodily move the heading-die transversely of the line of reciprocation of the slide while retaining it in parallelism therewith, and a spring for returning the plate to its normal position.

21. In a metal-working machine, the combination with the shaft, of a head operated thereby, a die-carrying slide, a cam having a surface for operating the slide and movable in ways on the head, and means for adjusting the cam radially with respect to the head.

22. In a metal-working machine, the combination with the shaft, of a head operated thereby, a cam having a recess in one of the sides thereof and radially movable in ways on the head, and a key in the recess for securing the cam in its adjusted position.

23. A metal-working machine, comprising a slide, a heading-die mounted upon the slide, and means for moving the heading-die in a path transverse to the line of movement of the slide, said means comprising a block pivoted to the slide and carrying said die, said block being provided with a slot, and said die being provided with a stud passing through said slot for limiting the motion of the block about its pivot.

24. A metal-working machine, comprising a slide, a heading-die mounted upon the slide, means for moving the heading-die in a path transverse to the line of movement of the slide, said means comprising a block pivoted to the slide and carrying said die, said block being provided with a slot, and said die being provided with a stud passing through said slot for limiting the motion of the block about its pivot, and means for swinging said block about its pivot.

25. A metal-working machine, comprising a slide, a heading-die connected therewith, means for moving the heading-die comprising a block pivoted to the slide and carrying the die, said block being provided with a slot and said die being provided with a stud passing through the slot, means for swinging said block in one direction about its pivot, and yielding means mounted on the slide for forcing the block in the opposite direction.

26. A feeding device comprising a pair of shafts, one of said shafts being movably mounted with respect to the other, a roller upon each of said shafts, said roller having a groove for receiving a wire, one of said rollers being composed of two disks, each of said disks having a depression extending entirely across its face, and means for angularly adjusting said disks with respect to each other about their axes, said means comprising a stud swiveled upon one of said disks, a stud swiveled upon the other disk, and a screw for connecting said studs, one of said disks being provided with a curved slot through which the stud mounted upon the other disk is adapted to pass, and one of said studs being provided with means for permitting the screw to turn therein without moving longitudinally with respect to the stud.

27. A feeding device comprising a pair of shafts, one of said shafts being movably mounted with respect to the other, a roller upon each of said shafts, said roller having a groove for receiving a wire, one of said rollers being composed of two disks, each of said disks having a depression extending entirely across its face, and means for angularly adjusting said disks with respect to each other about their axes, said means comprising a stud swiveled upon one of said disks, a stud swiveled upon the other disk, and a screw for connecting said studs.

28. A feeding device, comprising a pair of shafts, one of said shafts being movably mounted with respect to the other, a roller upon each of said shafts said roller having a groove for receiving a wire, one of said rollers being composed of two disks, each of said disks having a depression extending entirely across the face, and means for angularly adjusting said disks with respect to each other about their axes.

29. A metal-working machine, comprising a rotating head having two cam-surfaces, a die, means for transmitting motion to the die in one direction from one cam-surface, means for transmitting motion to the die in the other direction from the other cam-surface, and means for disengaging one of said means from its cam-surface without disturbing the other.

In testimony whereof I have signed my name to this specification in the presence of two subscribing witnesses.

JOHN BUCKLEY.

Witnesses:
H. P. CAMP,
WM. H. LOWE.